VOLTAGE CONVERTER TO DIGITAL CODE

Filed May 4, 1960 10 Sheets-Sheet 1

INVENTORS
STANLEY OKEN
SEYMOUR ROOK
KURT MERL
BY Borst and Borst
ATTORNEYS

INVENTORS
STANLEY OKEN
SEYMOUR ROOK
KURT MERL
BY Borst and Borst
ATTORNEYS

May 16, 1961 S. OKEN ET AL 2,984,831

VOLTAGE CONVERTER TO DIGITAL CODE

Filed May 4, 1960 10 Sheets-Sheet 6

May 16, 1961 S. OKEN ET AL 2,984,831

VOLTAGE CONVERTER TO DIGITAL CODE

Filed May 4, 1960 10 Sheets-Sheet 7

VOLTAGE PEAK DETECTOR

INVENTORS
STANLEY OKEN, SEYMOUR ROOK, KURT MERL.

BY Borstan & Borst

ATTORNEYS

May 16, 1961 S. OKEN ET AL 2,984,831

VOLTAGE CONVERTER TO DIGITAL CODE

Filed May 4, 1960

10 Sheets-Sheet 9

United States Patent Office 2,984,831
Patented May 16, 1961

2,984,831

VOLTAGE CONVERTER TO DIGITAL CODE

Stanley Oken, Plainview, Seymour Rook, Bayside, and Kurt Merl, Bronx, N.Y., assignors to Sperry Rand Corporation, Ford Instrument Company Division, Wilmington, Del., a corporation of Delaware Filed May 4, 1960, Ser. No. 26,834

6 Claims. (Cl. 340—347)

This invention relates to systems which are arranged to digitize analog quantities.

The present arrangement represents improvement over the synchro voltage to digital converter which is disclosed in application Ser No. 26,762, entitled "Synchro to Digital Converter," Richard Rabin, Stanley Oken, and Martin J. Slavin, applicants, who made their oaths to the application on May 2, 1960, in so far as it enables that converter to process various kinds of analog input quantities. The converter is rendered thereby more universal in operation and is thus enhanced in terms of its utility. The analog inputs employed in the converter described in the identified application are synchro transmitter voltages which are a function of shaft angle. The other types of analog quantities which the system embodying this invention enables the converter to process include A.C. analog voltages, D.C. analog voltages, resolver shaft angle and resolver trigonometric function voltages, and frequency modulated voltages. The present system permits of an extension of capabilities by utilization of time sharing techniques such that minimum equipment is required in addition to that described in the system disclosed in the above-identified application with the result that there is no need for separate conversion equipment to process each basic type of analog signal. In general the selection of the analogs is initiated by a function and address decoder, in response to signals from the digital computer associated with the converter. The decoder controls the conductive state of separate transmission gates for the analog signals and their corresponding reference voltages. In addition, the decoder is arranged to enable and inhibit the logical gates which control the encoding processes in the converter for the various categories of anologs.

One object of the invention is to provide an arrangement of computer units capable of selecting one or more analogs for introduction to an analog to digital converter on appropriate command signals and convert the selected analogs to digital form through the utilization of time sharing equipment.

Figure 1:
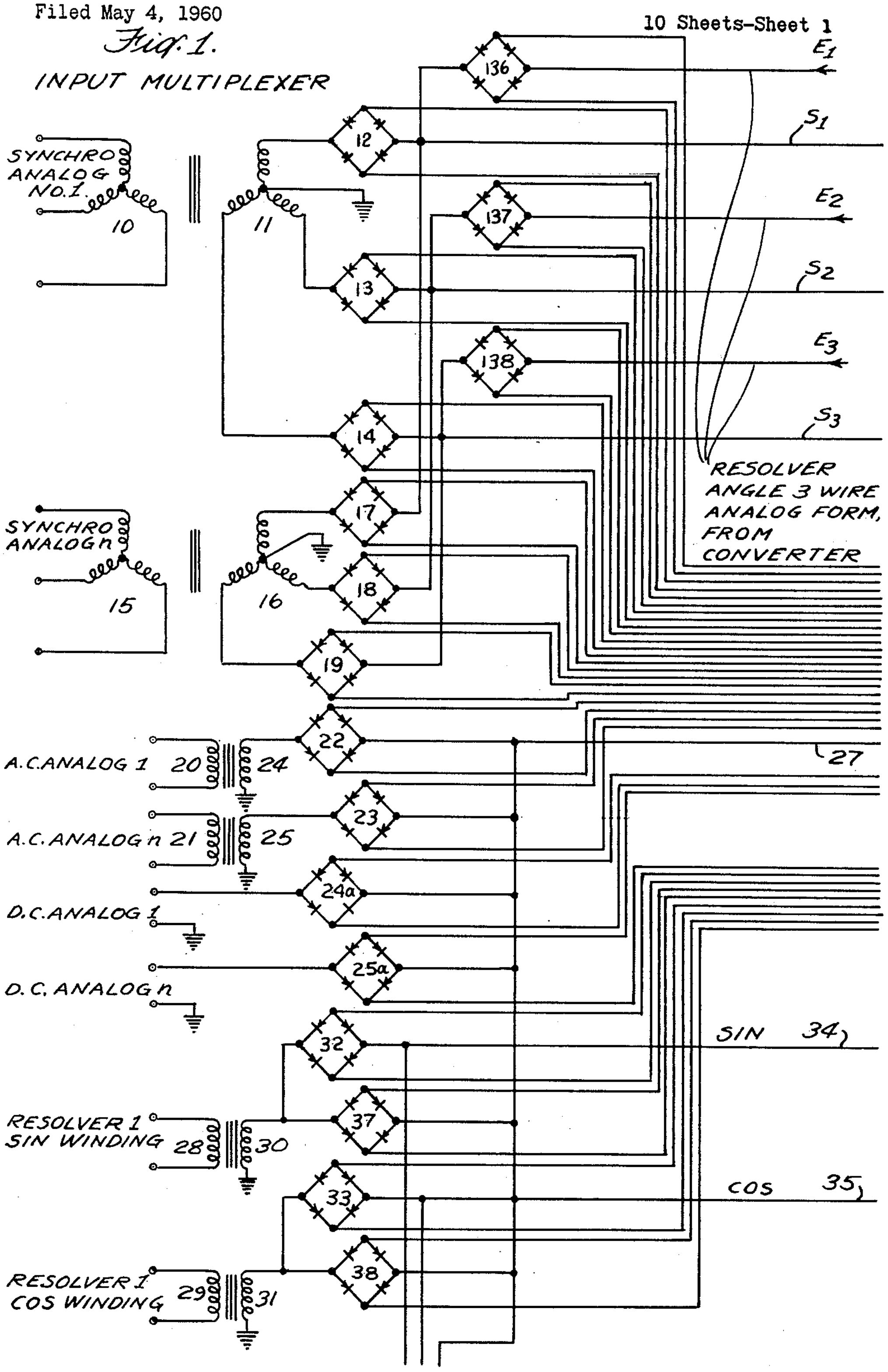
Figure 1A:
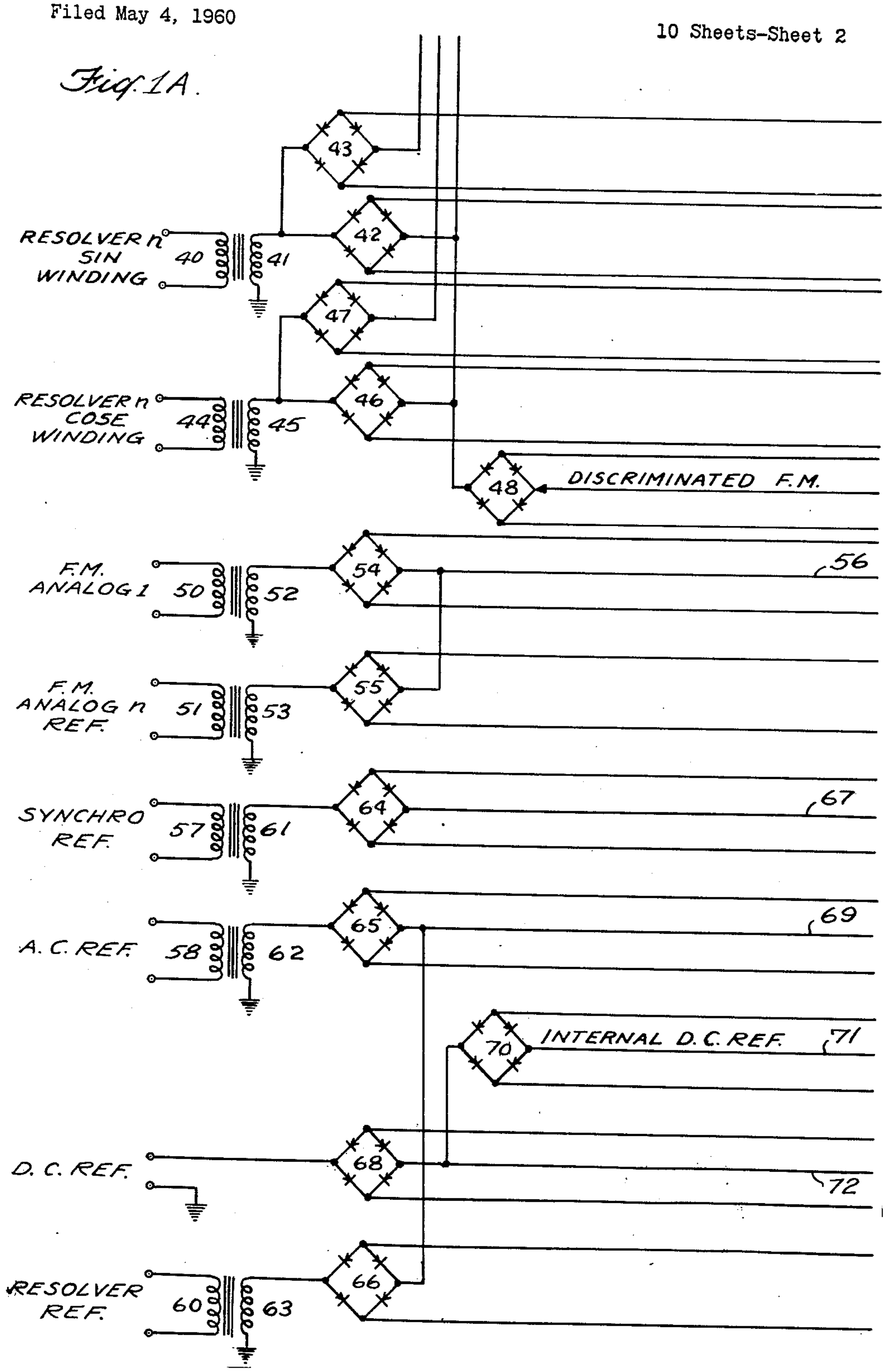
Figure 1B:
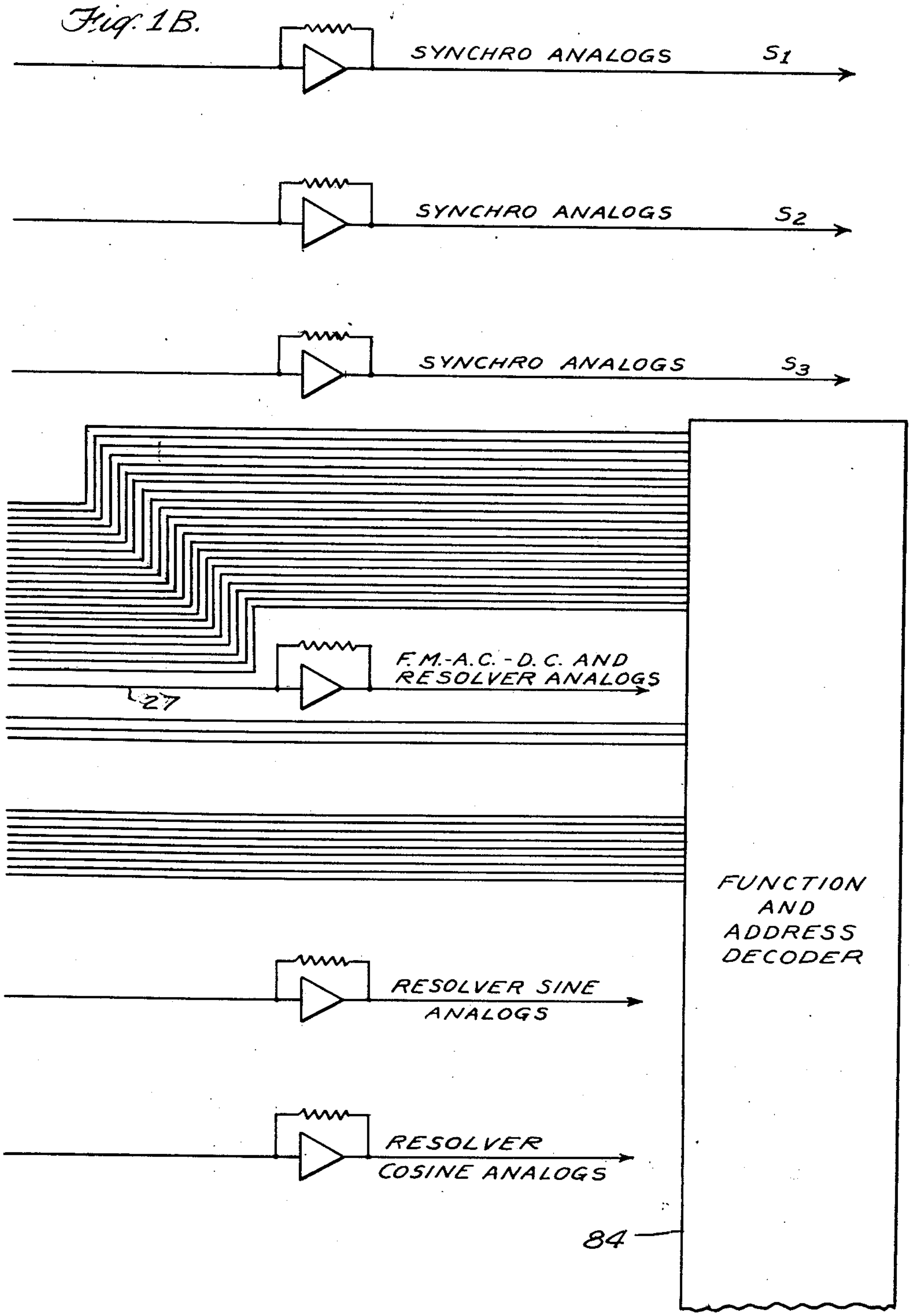
Figure 1C:
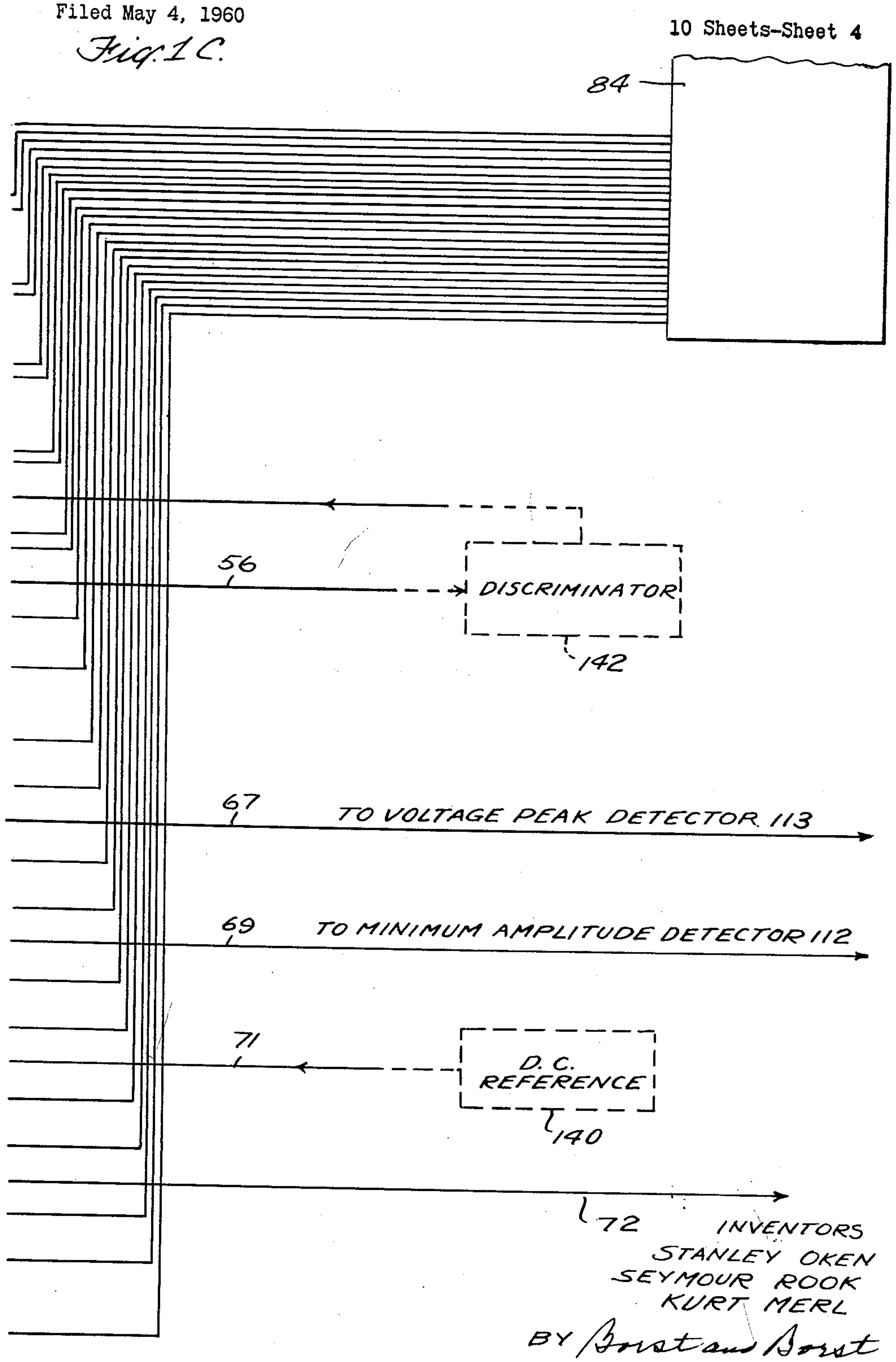
Figure 2:
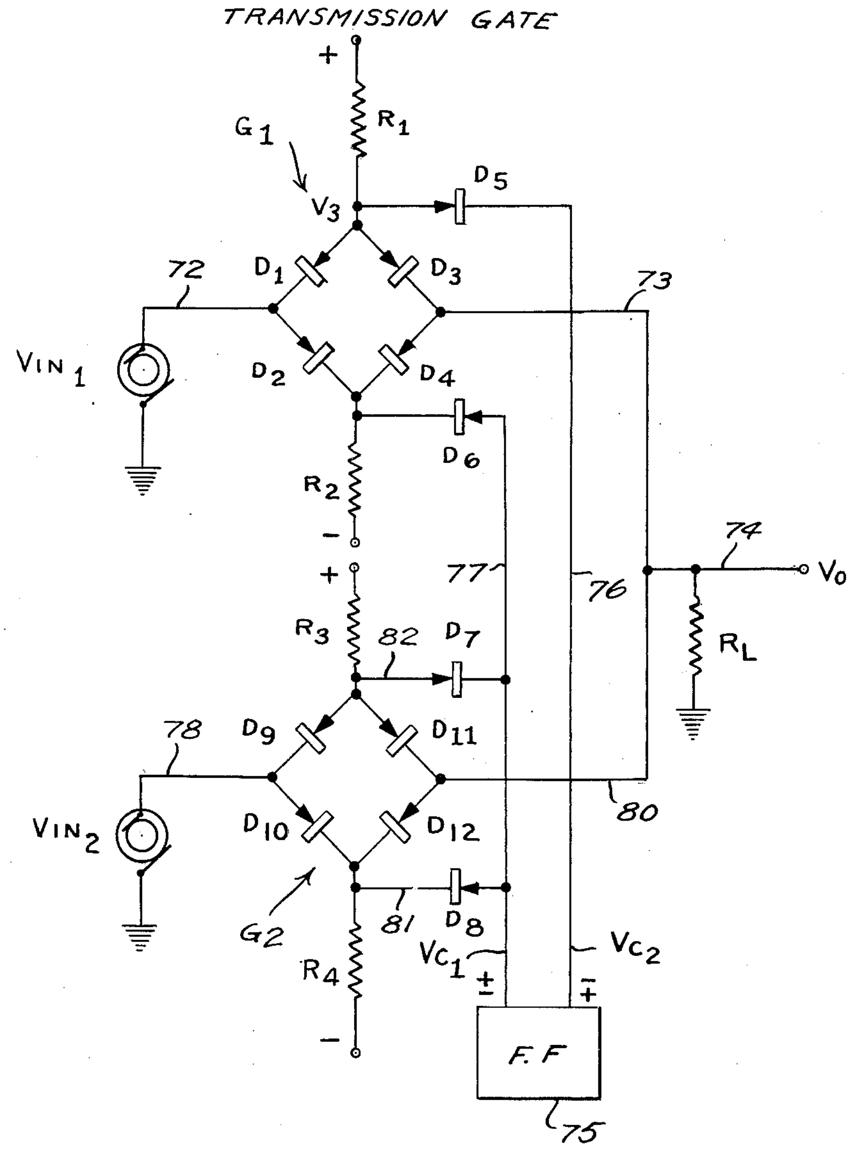
Figure 3:
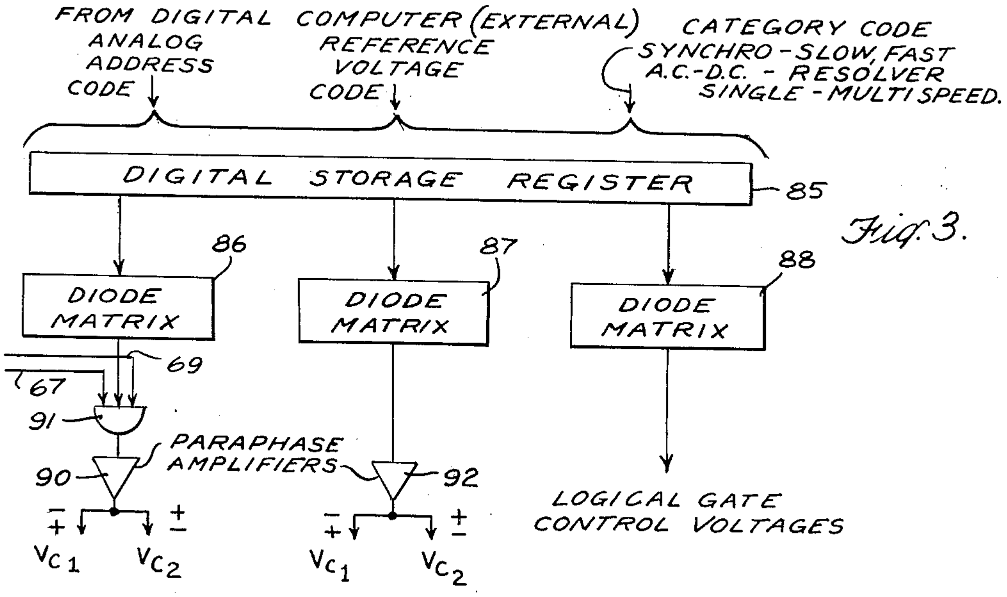
Figure 4:
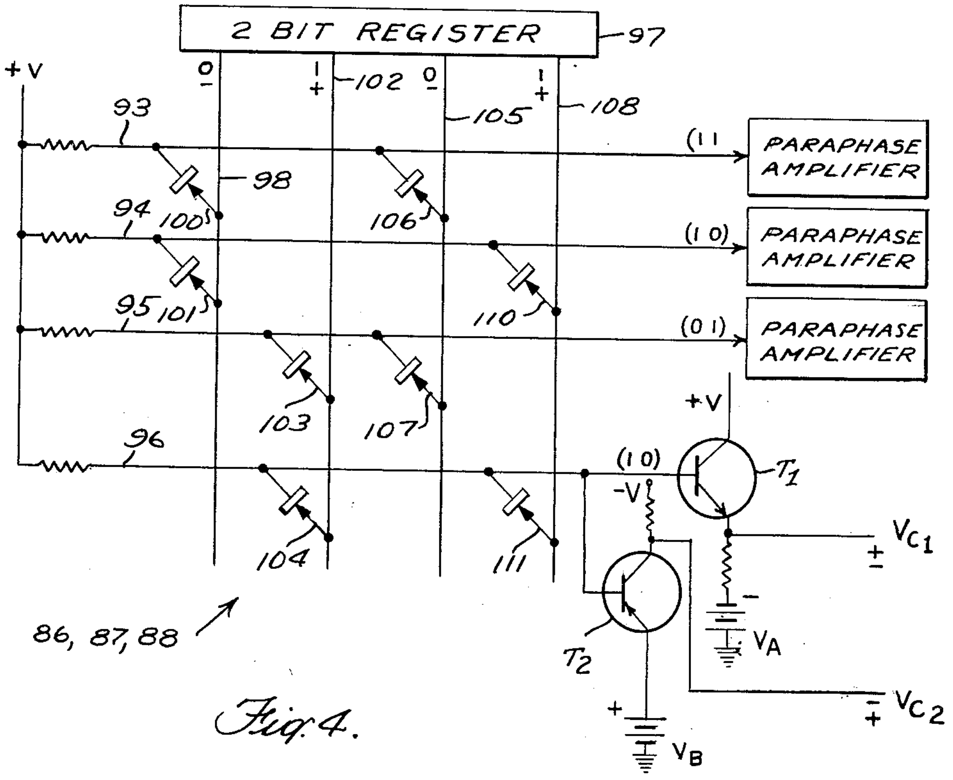
Figure 5:
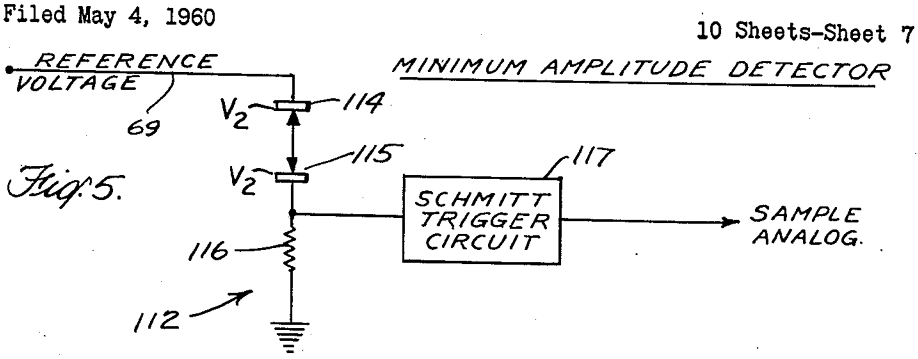
Figure 6:
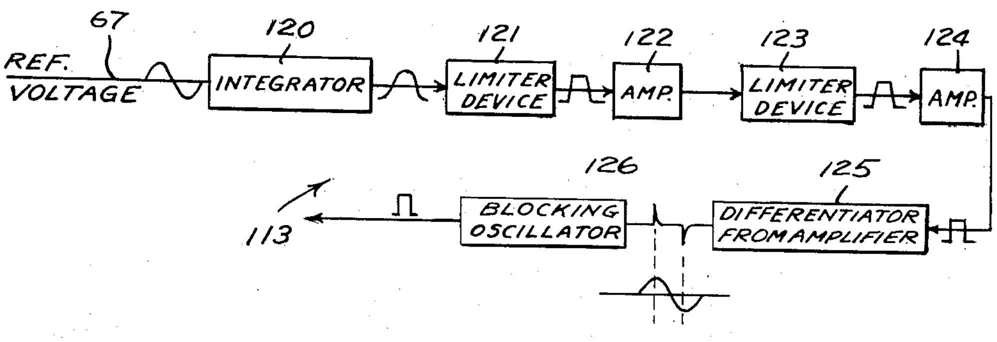
Figure 7:
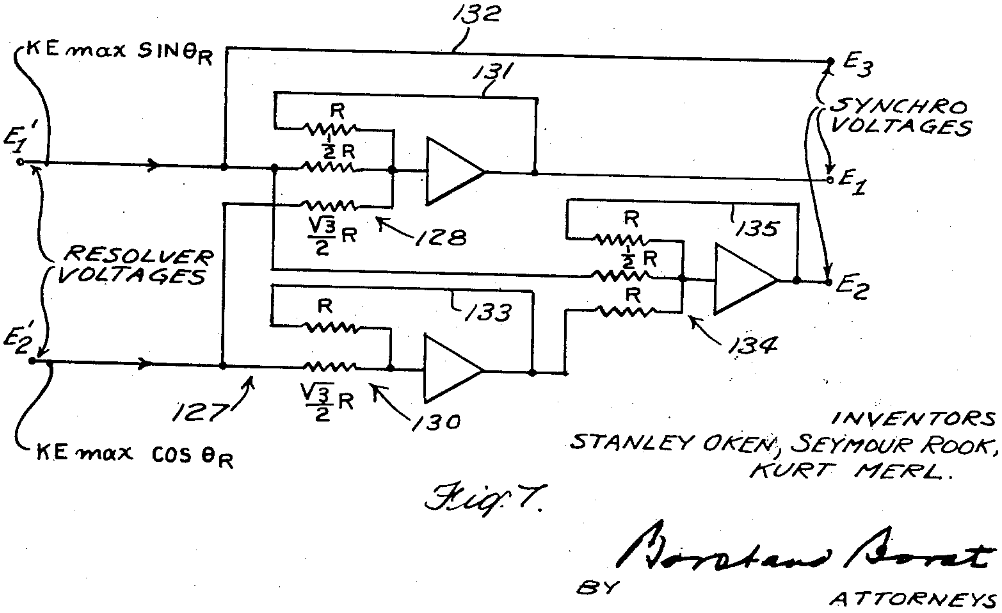
Figure 8:
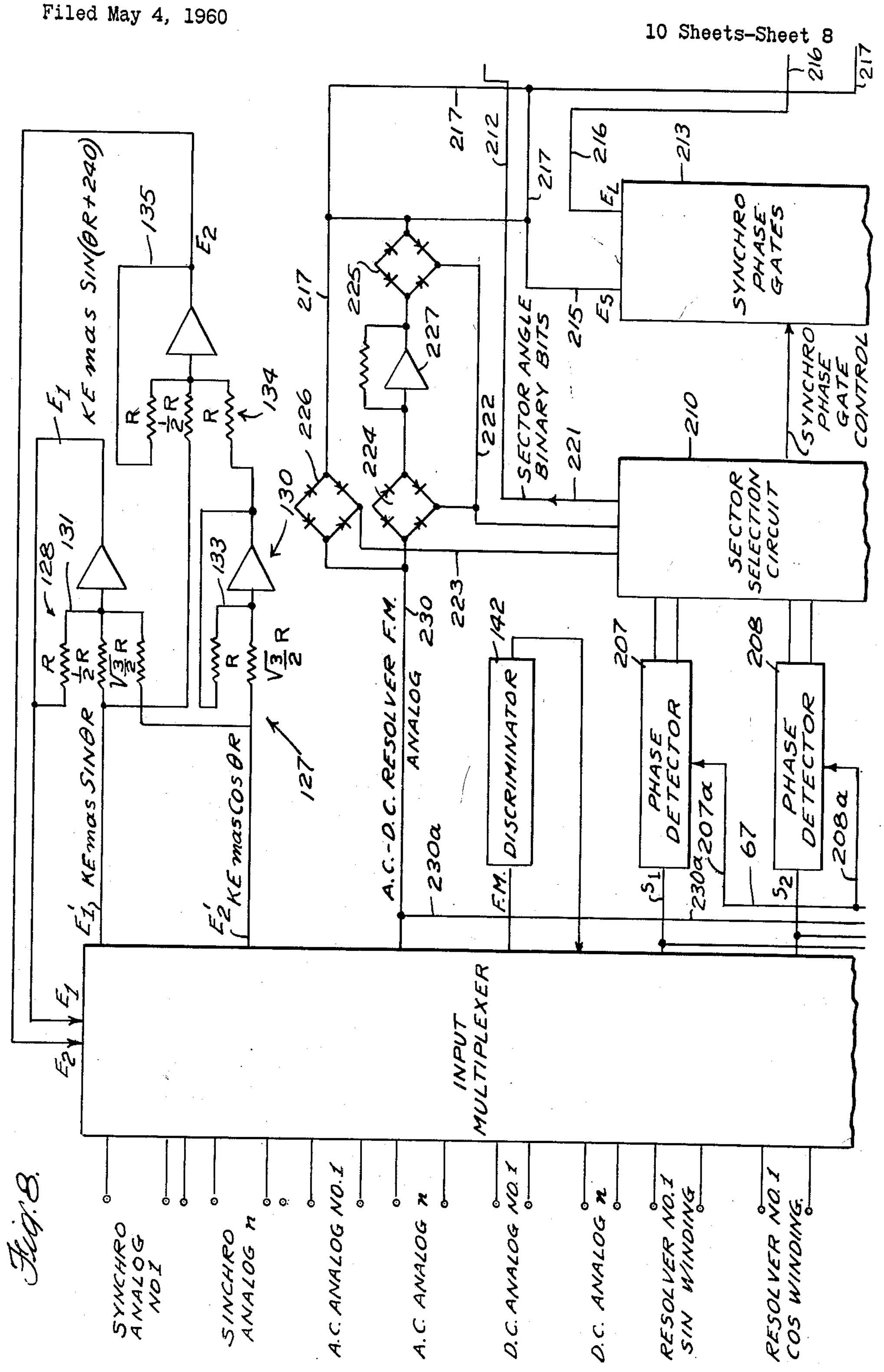
Figure 8A:
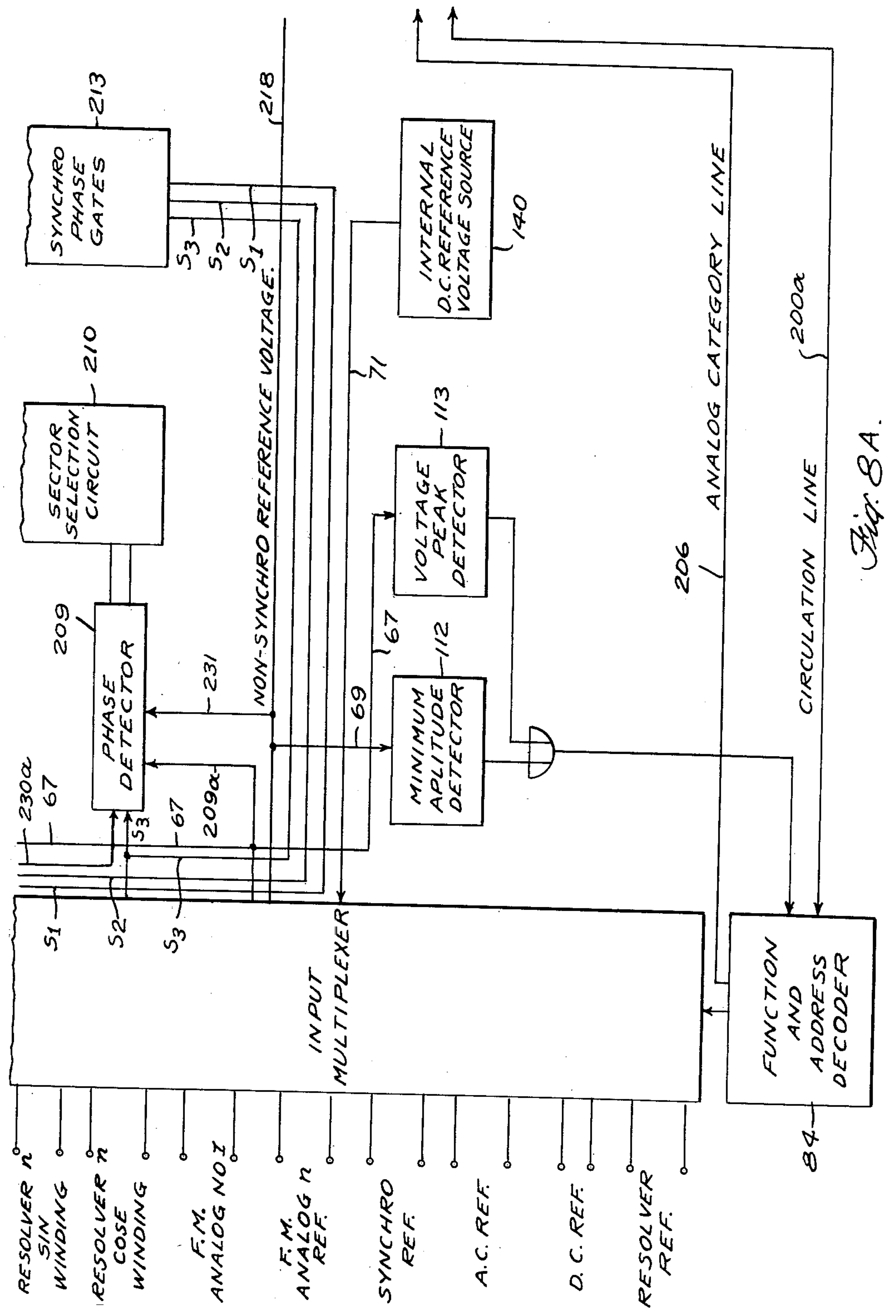
Figures 8B, 9:
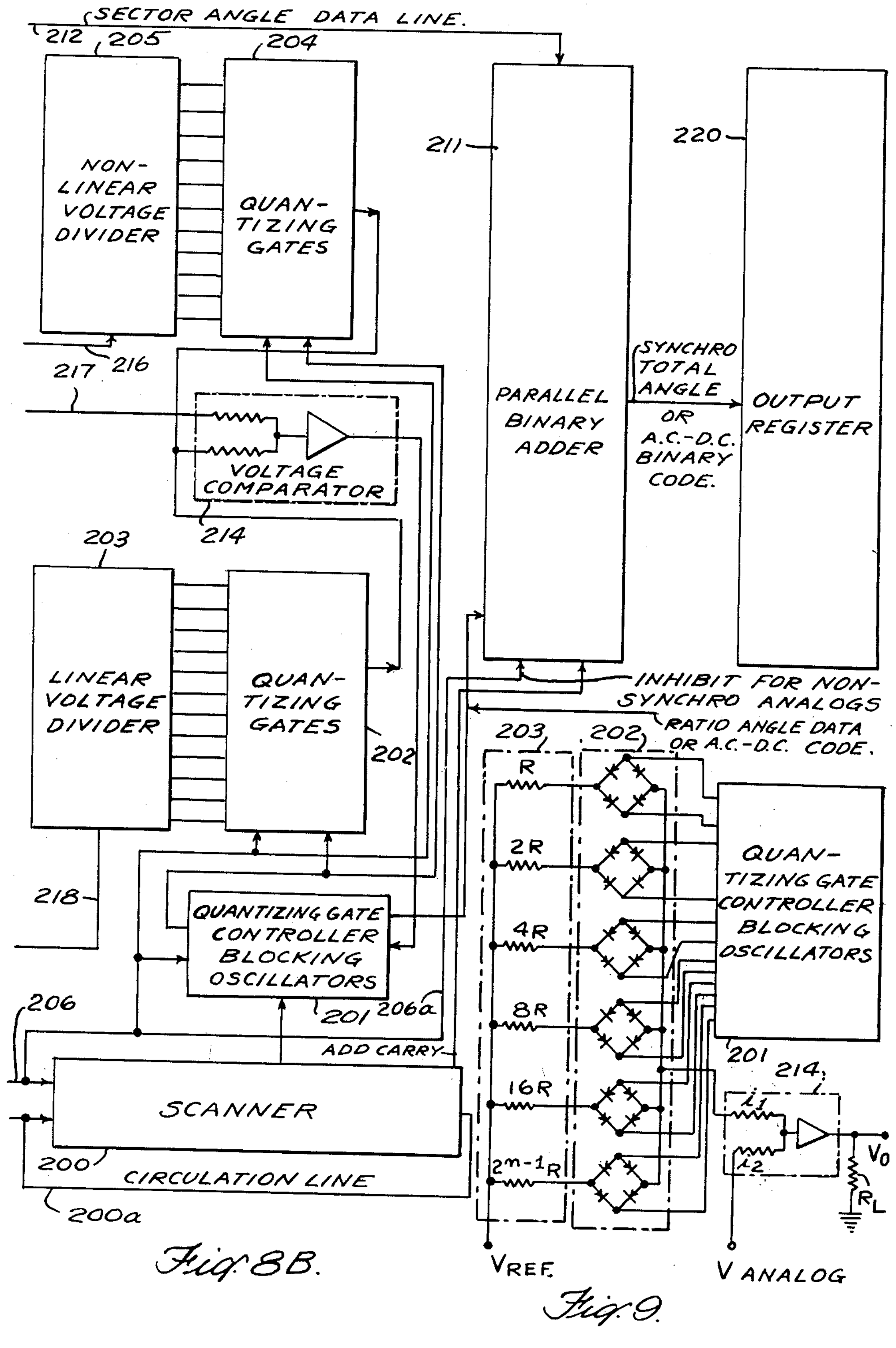

The objects and advantages of the invention may be appreciated on reading the following detailed description which is taken in conjunction with the accompanying drawings, in which Fig. 1, Fig. 1A, Fig. 1B and Fig. 1C combine to illustrate schematically the input multiplexer and function and address decoder for an analog to digital converter, Fig. 2 is a schematic of a typical transmission gate, Fig. 3 is a block diagram of the function and address decoder, Fig. 4 is a schematic of a typical diode matrix, Fig. 5 is a schematic diagram of the minimum amplitude detector, Fig. 6 is a schematic diagram of the voltage peak detector, Fig. 7 is a circuit arrangement for converting resolver voltages to synchro voltages, Fig. 8, Fig. 8A and Fig. 8B illustrate a combined block diagram of the universal converter, and Fig. 9 is a schematic showing the linear voltage divider which is employed by the converter in the processing of non-synchro analogs.

Referring to Fig. 1, it is seen that the input multiplexer comprises a plurality of transformer units, the analog voltages being applied to their primaries and coupled to transmission gates through their secondaries. Thus, stator lines of synchro transmitters are connected to the Y primaries 10 and 15 of three-phase transformers, to which are coupled secondaries 11 and 16. The synchro analog phase voltages are thus placed upon transmission gates 12, 13, 14, and 17, 18, 19, while the carrier reference for the synchro transmitters whose analog outputs are applied to the Y couplings above described is applied through a single-phase transformer having primary and secondary windings 57 and 61, respectively, and to transmission gate 64. Also A.C. analog voltages and their corresponding reference voltage are applied to primaries 20, 21 and 58, respectively, and coupled to transmission gates 22, 23 and 65 by secondary windings 24, 25 and 62, respectively. Further D.C. analog voltages and their corresponding references are applied to transmision gates 24*a* and 25*a* and 68. The output lines of gates 24*a* and 25*a* are connected to the output connection 27 which is a shared output connection for the transmission gates 22 and 23. In addition, resolver sine and cosine voltage analogs may be impressed on primaries 28, 29, 40 and 44, respectively. The sine and cosine analogs are introduced by the secondaries 30, 31 and 41, 45 to the transmission gates 32, 33 and 43, 47 connected to the output leads 34 and 35, respectively. Transmission gates 37, 38 and 42, 46 also connected to the secondaries 30, 31 and 41, 45, respectively, are connected into the common output lead conductor 27. The resolver reference voltage is impressed on the primary 60 and coupled by the secondary 63 to transmission gate 66 which is connected to the output lead 69. A transmission gate 48 is connected on its input side to the output terminals of an FM discriminator 142. Frequency modulated voltages which are applied to the input terminals of the discriminator will be placed in the output lead 27 when gate 48 is appropriately enabled. Frequency modulated analog voltages on the primaries 50 and 51 are coupled by secondaries 52 and 53 to transmission gates 54 and 55, respectively, which are connected to the common output conductor 56. Also synchro, A.C. and resolver reference voltages are adapted to be placed on the primaries 57, 58 and 60, respectively, and coupled by their corresponding secondaries 61, 62 and 63 to transmission gates 64, 65, and 66, respectively. Synchro reference output lead 67 is connected to the output of transmission gate 64 and is connected to a voltage peak detector 113. A D.C. reference voltage is applied to the transmission gate 68 and an output lead 72. Output lead 69 is arranged to convey the A.C. and resolver reference voltages to a minimum amplitude detector 112, said output lead being energized via gates 65 and 66. A D.C. internal reference voltage is obtained from a source 140 and applied to the transmission gate 70 by lead 71 and thence to the minimum amplitude detector lead 72 when the gate 70 is appropriately enabled.

Although the analog voltage is applied to a transmission gate, it will not be passed to the converter unless the gate is enabled. The enabling of the gates either singly or in groups for multi-wire analogs is effected selectively. The output lines of the gates are combined so that certain analog signals are channeled to common output lines to the converter. Each set of gates tied to a common output may be designated a gating module. Gating modules are combined as required by utilizing buffer amplifiers between modules in order that a single output line may be employed.

An effective circuit expedient for achieving a controlled transmission of the analog voltages is shown in Fig. 2. As there shown, gates $G_1$ and $G_2$ are paired, there being applied to the gates a pair of voltages $Vin_1$ and $Vin_2$ representing analog signal or analog reference voltages.

The gates are arranged in a bridge configuration with a half-wave diode rectifier in each leg of the bridge. In the gate $G_1$, the four diodes are designated $D_1$, $D_2$, $D_3$ and $D_4$. The voltage $Vin_1$ is introduced on line 72 to a junction of the legs of the bridge which include diodes $D_1$ and $D_2$, respectively. The gate output lead 73 is connected to the junction of the other two diodes, viz. $D_3$ and $D_4$, and placed across the load resistor $R_L$ as the voltage $V_o$ on output lead 74. A positive bias voltage is applied across the resistor $R_1$ to the junction of the legs of the bridge in which there are disposed the diodes $D_1$ and $D_3$, respectively. The potential applied to this junction is the potential $V_3$. A negative bias voltage is applied across resistor $R_2$ to the junction of the bridge legs which include the diodes $D_2$ and $D_4$. The potential at the latter junction is $V_4$. A flip-flop device 75 which generates positive and negative voltages selectively in its output leads is connected by $Vc_2$ lead 76 to the junction of the resistor $R_1$ and the bridge while output lead 77 of the flip-flop which carries the voltage $Vc_1$ is connected to the junction of the resistor $R_2$ and the bridge. A diode rectifier $D_5$ poled away from the bridge and a diode rectifier $D_6$ poled toward the bridge are disposed in the leads 76 and 77, respectively. The gate $G_2$ is also arranged in bridge configuration and has diodes $D_9$, $D_{10}$, $D_{11}$ and $D_{12}$ separately disposed in the bridge legs. The voltage $Vin_2$ is introduced on lead 78 to the bridge at the junction of the legs which include the diodes $D_9$ and $D_{10}$ and the gate output lead 80 is connected between the output lead 74 and the bridge at the junction of its legs which include the diodes $D_{11}$ and $D_{12}$. A positive bias voltage is applied across resistor $R_3$ to the junction of the legs of the gate $G_2$ in which are placed the diodes $D_9$ and $D_{11}$. A negative bias voltage is applied across resistor $R_4$ to the junction of the legs which include the diodes $D_{10}$ and $D_{12}$. The output lead 77 of the flip-flop device 75 is connected to the junction of the resistor $R_4$ and the bridge by means of lead 81 while the output lead 76 of the flip-flop is connected to the junction of the resistor $R_3$ and the bridge by means of the lead 82. The lead 81 includes a diode $D_8$ poled towards the bridge and the lead 82 includes a diode $D_7$ poled away from the bridge.

The operation of the transmission gate is described as follows:

When the control voltages from the flip-flop are $-Vc_1$ and $+Vc_2$, the diodes $D_5$ and $D_6$ of the gate $G_1$ will be conductive, and the potential $V_3$ will be clamped to a negative potential while the potential $V_4$ is clamped to a positive potential. Consequently the diodes $D_1$ through $D_4$ will be reverse-biased thereby preventing transmission of signal through $G_1$.

The potentials $-Vc_1$ and $+Vc_2$ are also reverse-biasing diodes $D_7$ and $D_8$ of $G_2$, thereby permitting forward current to flow through the bridge. Gate $G_2$ will, therefore, transmit $Vin_2$ to the output terminal. By triggering the flip-flop into the complementary state, potentials $Vc_1$ and $Vc_2$ are reversed in polarity. This causes the diodes $D_5$ and $D_6$ to become reverse biased, while the diodes $D_7$ and $D_8$ conduct. As a result $G_1$ will now transmit $Vin_1$ to the output terminal and $Vin_2$ will be blocked by the inhibited gate $G_2$.

In connection with Fig. 2, it is seen that the gates are operated to pass selectively an analog signal voltage or a reference voltage by enabling one gate and inhibiting the other gate with positive and negative gate control voltages. The latter voltages are actually furnished by a function and address decoder 84 which is schematically illustrated in Fig. 3. It is seen therein that the decoder comprises a storage register 85 and a group of diode matrixes 86, 87 and 88. The storage register includes the gate enabling and inhibiting flip-flop devices which are separately controlled by signals from external equipment (not shown) including the digital computer with which the converter is associated. These signals are in the form of a digital code termed data address. Accordingly, one signal applied to one device in the register is the analog address code. Another signal is the reference voltage code and a third signal is the catgory code designating which of the several type of analogs is to be applied to the converter for processing. The output of the diode matrix 86 is connected to a paraphase amplifier 90, the outputs of which are the positive and negative analog signal transmission gate control voltages. The logical gate 91 is connected between the output of the diode matrix 86 and the amplifier 90 being controlled by the minimum amplitude and voltage peak detectors described below. It is their function to prevent the logical gate from being enabled until a control signal from the minimum amplitude detector or voltage peak detector is applied. The outputs of the diode matrix 87 and its associated paraphase amplifier 92 are the control voltages for the reference transmission gates. The matrix 88 provides the enabling and inhibiting voltages for the logical gates in the converter which control the encoding processes of the various categories of analogs.

There is shown in Fig. 4 a schematic diagram of a typical diode matrix. This matrix comprises four parallel output lines 93, 94, 95 and 96 to which there is applied a potential $+V$. A two bit register 97 containing a pair of flip-flop devices is connected by diodes to the parallel lines. There are four register to diode connecting leads. A lead 98 is connected by diodes 100 and 101 to the lines 93 and 94, respectively. A lead 102 is connected to the lines 95 and 96 by diodes 103 and 104, respectively. The lead 105 is connected to the output lines 93 and 95 by the diodes 106 and 107, respectively, and the lead 108 is connected to the lines 94 and 96 by the diodes 110 and 111, respectively. Each of the output lines is connected to a paraphase amplifier comprising a pair of complementary transistors $T_1$ and $T_2$ of the NPN type and PNP type, respectively. The output line is connected to the base electrodes of the two transistors, emitter electrodes of which are biased respectively by the negative voltage source $V_A$ and the positive voltage source $V_B$. The collector electrodes of the two transistors are also biased by the voltage sources $+V$ and $-V$, respectively. The output of one transistor $T_1$ is $\pm Vc_1$ and the output of the transistor $T_2$ is $\mp Vc_2$. The voltages $Vc_1$ and $Vc_2$ play the same role in inhibiting or enabling transmission gates as did the output voltages $Vc_1$ and $Vc_2$ emanating from the flip-flop device 75 shown in Fig. 2. The matrix will deliver a positive voltage on one of the four parallel output lines while the other lines remain negative. Positive voltages appear on the output lines when the binary codes shown in parenthesis in Fig. 4 appear in the register. When the signal on the matrix output line 96 is positive, the transistor $T_1$ will saturate and the transistor $T_2$ will cut off. This causes the gate controlling voltage $Vc_1$ to be positive and the gate controlling voltage $Vc_2$ to be negative. When the matrix output line is negative the reverse conditions obtain. The positive and negative voltages which appear on the output lines of the matrix must be greater in amplitude than the transistor bias voltages $-V_A$ and $+V_B$.

Each time a new data address is applied to the function and address decoder by the digital computer an appropriate gate control signal is generated as described above. This signal then enables the selected analog and associated analog reference transmission gates in the input multiplexer and also applies an appropriate reference voltage to either the minimum amplitude detector 112 or the voltage peak detector 113.

As shown in Fig. 5 the minimum amplitude detector comprises back-to-back zener diodes 114 and 115 to which the reference voltage is applied. The output of the diodes is applied across a grounded resistor 116 to a Schmitt Trigger device 117. A minimum amplitude detector is provided wherever an A.C. carrier voltage is used to excite a transducer the output of which is the selected analog passed by the multiplexer to the converter. The reason for providing the minimum amplitude detector is the impossibility of converting any analog signal to a digital signal with accuracy at an instant when its associated analog reference voltage is at or near zero amplitude. At this time the analog signal is also at or near its zero amplitude level assuming little or no phase shift in the transducer. The converter is prevented by the detector from processing A.C. carrier type signals until the carrier amplitude has reached approximately 25% of its peak value. This percentage may vary dependent upon the peak amplitude of the reference, and the conversion accuracy required. For those transducers in which there exists a substantial phase shift between signal and carrier excitation, an equivalent phase shift must be introduced into the reference voltage lines before application to the conversion equipment. When the applied reference voltage is less than the breakdown potential of the zener diodes in the detector, practically the entire voltage will appear across the diodes. As soon as the reference voltage exceeds the zener potential, the voltage drop across resistor 116 will increase rapidly. The Schmitt Trigger circuit 117 will fire as soon as the drop across the resistor 116 exceeds some threshold level, and an output voltage will be generated permitting the designated analog signal to be gated through to the converter.

As described in said above-mentioned patent application, a voltage peak detector is required where the analog is a synchro quantity. When the fine shaft signals of the synchro are changing at rates in excess of several cycles per second, it is necessary to perform the conversion process at or near the peak amplitude points of the synchro carrier signal in order to minimize errors due to induced velocity voltages in the synchro. As shown in Fig. 6 the voltage peak detector comprises in series an integrator 120 to which the excitation or reference voltage of the synchro is applied, a limiter device 121, an amplifier 122, a second limiter device 123, a second amplifier 124, a differentiator 125 and a blocking oscillator 126. The integrator is a conventional device having an operational amplifier with a capacitor in its feedback leg and provides a 90° phase shift in the reference voltage. This is done because zero amplitude detection may be accomplished much more accurately than peak detection. By successively amplifying and limiting the signal, the gradient about the zero crossover may be sharpened to a high degree of resolution. The amplified signal is differentiated by an RC network in the differentiator and applied to the blocking oscillator. Thus, each time the voltage passes through zero amplitude with positive or negative slope, the blocking oscillator is triggered on. The firing of the blocking oscillator may be made to coincide exactly with the peak of the reference voltage or it may be shifted several degrees either side of the peak by adjustment of the phase shift in the integrator.

The conversion of the synchro analog to digital form which is effected when an appropriate address code assigned to this type of analog conditions the diode matrixes to generate the bi-polar voltage required for the enabling of analog transmission gates 12, 13 and 14 and analog reference gate 64 as described in connection with said above-mentioned patent application. The conversion of the other analogs arranged to be applied to the transformers in the input multiplexer is accomplished in similar fashion.

When processing resolver signals, it is possible to convert the resolver voltages to a digital representation of the resolver shaft angle or to digital representations of the resolver voltages, that is, sine and cosine functions. The command for data issuing from the digital computer will contain information as to which type of data is required. This information in the form of address code will then be decoded in the function and address decoder and the appropriate processing will ensue. If the digital representation of resolver shaft angle is required, the resolver voltages will be applied via the input multiplexer to a converter 127 which is illustrated in Fig. 7. This converter is arranged to convert the resolver voltages to synchro voltages so that the output leads of the gates 12, 13 and 14 may be used to introduce the converted resolver signals to the synchro to digital converting section of the converter. As shown in Fig. 7, the resolver voltage $E_1'$ and $E_2'$ are applied to the networks 128 and 130, respectively. One leg of the network 128 also receives the voltage $E_2'$ while the third leg of the network 128 receives the amplified output of the network on a feedback lead 131. This output is then placed on one of the synchro voltage leads as voltage $e_1$. A lead 132 is connected to receive the resolver voltage $E_1'$ and place that voltage directly on one of the synchro voltage leads as the voltage $E_3$. A second leg in the network 130 receives the amplified output of the network on feedback lead 133 which also places this output on one leg of a third network 134. A second leg of the network 134 receives the resolver voltage $E_1'$ directly while the third leg of the network 134 receives the amplified output of the network feedback lead 135, this output being introduced to one of the synchro voltage lines as voltage $E_2$. Thus the voltage $E_3$ on line 132 is not converted and is directly available from the resolver. This voltage may be represented by the expression $KE_{max} \sin \theta_R \sin wt$. The voltages $E_2$ and $E_1$ are converted by this circuitry to a voltage which is shifted in phase from the voltage $E_3$ by 120° and 240°, respectively. Thus the voltage $E_2$ may be represented by the expression $KE_{max} \sin (\theta_R+120) \sin wt$ and the voltage $E_1$ is represented by the expression $KE_{max} \sin (\theta_R+240) \sin wt$. The converter is in effect an instrumentation of the following equations:

$$\sin (\theta_R+120°) = -\tfrac{1}{2} \sin \theta_R + \frac{\sqrt{3}}{2} \cos \theta_R$$

$$\sin (\theta_R+240°) = -\tfrac{1}{2} \sin \theta_R - \frac{\sqrt{3}}{2} \cos \theta_R$$

These voltages are returned to the input multiplexer where they are gated into the converter on the same lines as for the standard synchro analogs. The voltages $E_1$, $E_2$ and $E_3$ are applied to the transmission gates 136, 137, 138 and are processed in the same manner as the synchro analogs are processed and a digital representation of resolver angle $\theta_R$ is generated, the resolver reference being gated by the transmission gate 66 to the converter on line 69.

If it is desired to represent the sine or cosine resolver voltages digitally in lieu of resolver shaft position, the output of the sine or the cosine resolver transformer, depending on the command from the function and address decoder, is gated by either transmission gates 37 or 42 for the sine function or the transmission gates 38 or 46 for the cosine function to the output line 27 which is connected into the converter. The voltage on the analog line 27 is then processed in the converter as an A.C. analog. The associated reference voltage for this analog is introduced to the converter by the resolver reference transformer having a primary winding 60 and a secondary winding 63.

The transmission gates 22 or 23, and 65, also apply the A.C. analog and its associated reference voltage to the analog line 27, the digital quantity for this analog being established in the converter by determining the ratio of the instantaneous amplitude of the analog quantity with respect to its reference voltage amplitude. A linear voltage divider in the converter is employed to establish this ratio which is completely determinative of the conversion. No sector information is required as was the case for synchro to digital conversion and hence a control voltage derived from the function and address decoder is furnished the converter to inhibit that section of the converter which provides such sector information. One of the phase detectors which are normally employed for synchro to digital conversion in the converter is employed for A.C./D.C. and resolver voltage to digital conversions to determine the relative phase of the reference voltage which is applied to the linear voltage divider and the analog signal which is applied to the comparator in the converter. This is required in order that the reference and analog voltages which are added and compared in the converter will be of opposite polarity.

The processing of the D.C. analogs in the converter is identical with that for A.C. analogs. The same operative components are employed therein. The D.C. analog signal is applied to the transmission gate 24 which introduces the signal to the converter by means of the line 27 on appropriate command from the function and address decoder. The D.C. analog reference may be obtained from the D.C. transducer and placed on line 72 by means of the transmission gate 68. In the alternative an accurate reference voltage may be derived from a separate D.C. reference source 140 and introduced to the converter, through the transmission gate 70 and the output line 72. The D.C. reference source 140 may be incorporated in the converter or provided as a separate component. Circuitry known to the art may be employed to provide a D.C. reference voltage with an accuracy of .01%. An accuracy of that order would be required for conversion accuracy of .1%.

Another analog which the converter described herein is capable of encoding digitally is a frequency modulated voltage. It has been found that if the frequency modulated analog signal is applied to an F.M. discriminator capable of developing a D.C. signal proportional to the deviation in carrier frequency, it may be processed by the converter in the same manner as a D.C. analog signal. Accordingly, the frequency modulated analog voltage applied to the output line 56 by the transmission gates 54 or 55, on appropriate command from the function and address decoder is introduced to a discriminator 142 which is a conventional device and may be located in the converter or as a component separate therefrom. The transmission gate 48 is enabled by the function and address decoder to apply the discriminated D.C. voltage, whose amplitude is proportional to the frequency modulated carrier frequency deviation, to the converter via the output line 27.

The voltage peak detector requires a synchro reference voltage for its operation and to this end the gate 64 is enabled on appropriate command signal which will issue when a synchro analog is to be processed in the converter. The gates 65, 66 and 68 or 70 will be enabled on appropriate command signals from the function and address decoder and place the appropriate reference signal on line 69 leading to the minimum amplitude detector. The buffer amplifiers disposed in the output lines of the multiplexer are linear amplifiers of the operational type. They have a closed loop amplification of —1. The complexity of the gating circuitry in the input multiplexer will in general be dependent upon the number of different categories of analogs that the converter is designed to process. The described multiplexer is capable of selectively introducing those analogs to the converter which the latter is able to handle with minimum modification of the sector selection and ratio determining components.

The basic operation of the converter is described in the above-identified application which explains the conversion from synchro voltage to digital representation of synchro shaft angle. Fig. 8, Fig. 8A and Fig. 8B illustrate in combined block diagram form the present universal converter including the multiplexer and the function and address decoder. As explained therein a scanner is used as a program control sequencer, this component being employed to control blocking oscillators which in turn provide enabling and inhibiting control voltages for the gates disposed in the output of a nonlinear voltage divider. As shown therein, the scanner 200 is connected to the input side of a quantizing gate controller 201 which contains the blocking oscillators. The oscillators in the controller 201 are separately connected to gates in the quantizing gate box 202 for a linear voltage divider 203 and to gates in the quantizing gate box 204 for the non-linear voltage divider 205. The scanner 200 is caused to deliver in sequence a pulse group to the blocking oscillators in the controller 201 in one operation or repeatedly in two or even three operations depending upon the category of analog which is being processed by the converter. Circulation line 200*a* for the scanner and analog category line 206 from the function and address decoder determine whether or not the latter will be inhibited or will repeat at the end of an operation. For example, when a single speed synchro is being processed as opposed to multispeed synchros, it is only necessary to go through the programed sequence of processing events once. In handling multispeed inputs, two-speed or three-speed inputs, the processing sequence is repeated for each speed. The function and address decoder 84 provides a control signal on line 206 for each data address code which categorizes the data to be processed. More specifically, this control signal is generated in the output of the diode matrix 88 in the function and address decoder.

The identity of the analog which it is desired to process is accomplished simply by assigning address code groups to each type of analog. As a result, when the address code group for digitizing resolver shaft angle or one, two or three-speed synchro voltages is conveyed from the associated computer to the function and address decoder, the designated analog signal is placed via the input multiplexer into phase detectors 207, 208 and 209 which also receive the synchro reference or carrier signal on conductors 207*a*, 208*a* and 209*a*, respectively. The sector selection circuit 210 derives from the phase detectors information relating to sector angle which is placed in the parallel binary adder 211 by means of line 212. In addition, the sector selection circuit supplies a synchro phase gate control signal to the synchro phase gates in box 213 to which the three phase voltages are introduced. As explained in the above-identified application, the synchro phase gates 213 controlled by the sector selection circuit, selects the largest voltage, $E_L$, and the smallest voltage, $E_S$, of the three-phase voltages in each 60° sector. The voltage $E_S$ is applied directly to the voltage comparator 214 by means of line 215 and the largest voltage, $E_L$, is applied by means of line 216 to the non-linear voltage divider which, employing the half-split technique, is selectively sampled until the percentage of the voltage $E_L$ equal to the voltage $E_S$ is determined by the comparator 214.

If the analog which is to be digitized is an A.C. voltage, a D.C. voltage, or a trigonometric resolver voltage, the designated analog will be placed onto line 230 via the input multiplexer from which it is further gated via gates 224, 225 or 226 to the voltage comparator 214. Employing the half-split sampling technique the linear voltage divider 203 in conjunction with the quantizing gates in box 202 cause the various percentages of the reference voltage supplied the linear voltage divider on line 218 and corresponding to the analog voltage on line 217 to be compared with the latter in the comparator until the desired ratio is obtained, this ratio being determinative of the correct binary representation in the output register 220. The analog and sampled reference voltages must be of opposing polarity in the comparator and to this end the sector selection circuit 210 is connected by lines 221, 222 and by line 223 to transmission gates 224, 225 and transmission gate 226, respectively, which are connected into the non-synchro analog line 230. An operational amplifier 227 having a gain of −1 is disposed between the gates 224 and 225. The analog voltage on line 230 is conveyed to the phase detector 209 by means of lead 230*a* which also receives the corresponding non-synchro reference voltage from line 218 which is connected to the phase detector by line 231. The phase detector 209 is connected to the sector selection circuit and in conjunction therewith selectively enables or inhibits the transmission gates 224, 225 and transmission gate 226 according to the relative polarities of the two voltages. If the polarities of the analog voltage and its associated reference voltage are opposing the gate 226 will be enabled and the gates 224 and 225 will be inhibited so that the analog voltage on line 230 may be applied directly to the comparator. On the other hand, if the two voltages are in phase the gates 224 and 225 will be enabled and the gate 226 will be inhibited so that the amplifier 227 will be permitted to reverse the phase of the analog voltage relative to its reference voltage.

Fig. 9 indicates the arrangement of the linear voltage divider to which the reference voltage is applied when a non-synchro analog is being processed in the converter. It is seen that the linear voltage divider comprises a plurality of resistor legs in parallel, the conductivity in each resistor leg being controlled by a separate transmission gate. The transmission gates in the linear voltage divider 203 are sequentially enabled by the control signals generated within block 201. The gates are controlled by the blocking oscillators in the controller 201 in the same manner as described in the above-identified application. The reference voltage, V*ref*, is applied to the network at the input side thereof. The output of the network is placed on one leg of a comparison network in the comparator 214, the other leg of the comparison network receiving the corresponding non-synchro analog voltage. The current through the first-mentioned leg is designated $i_1$ and the current in the other leg of the comparator is designated $i_2$ while the output voltage applied to the blocking oscillators in the controller 201 is designated $V_o$. The transmission gates 202 are thus enabled in sequence and the voltage $V_o$ is sensed by the comparator. By successive approximations a combination of gates is determined such that the current $i_1$ equals the current $i_2$. This gate combination is then the coded representation of the analog amplitude. As indicated above, where the analog voltage is a D.C. voltage, its corresponding reference voltage which is applied to the linear voltage divider may be derived alternatively from the D.C. transducer or the internal D.C. reference source in box 140 which is shown in Fig. 8 as a component of the converter and connected back to the input multiplexer by the conductor 71. Also as indicated above the minimum amplitude detector 112 is employed when the selected analog is non-synchro while the voltage peak detector 113 is employed when the selected analog is a synchro voltage in which velocity errors must be minimized. The binaray adder 211 is inhibited by a control signal on line 206*a* for the processing of all non-synchro analogs.

Where the selected analog is a frequency modulated voltage, it is demodulated in the F.M. discriminator 142 and multiplexed to the line 217 and then processed as any of the other non-synchro analogs.

It is understood, however, that various modifications in the arrangement of components hereinabove described may be effected without departing from the scope and principal of the invention as defined in the appended claims.

What is claimed is:

1. A universal analog to digital converter comprising an input multiplexer arranged to receive various types of analog and reference voltages, a function and address decoder connected to said multiplexer, a converter, said decoder having means to select in said multiplexer analog and corresponding reference voltages for introduction to said converter, said converter comprising a non-linear voltage dividing network, means for selectively placing one phase of a three phase voltage in said network, a comparator, means for placing selectively one phase of the remaining two voltage phases in said comparator, a reference voltage connection between said multiplexer and said selective means, a gate system disposed between said non-linear voltage divider and said comparator, a quantizing gate controller and scanner for said gate system disposed in the output of said comparator and arranged to cause the latter component to sample sequentially the voltages on said non-linear voltage divider until the two input voltages in said comparator are equal, a linear voltage divider, a second gate system disposed between said linear voltage divider and said comparator, said multiplexer and decoder being arranged to pass selectively a reference voltage corresponding to the single phase analog voltage selected by said multiplexer and decoder to said linear voltage divider, a single phase analog voltage connection between said multiplexer and said comparator, means in said selective means and said single phase, analog connection for assuring that the selected single phase, analog voltage and its reference voltage will have opposing polarity, said second gate system being controlled by said quantizing gate controller and scanner so as to pass sequentially the various voltages on said linear voltage divider to said comparator until the input voltages in said comparator are equal, a parallel binary adder connected to said selective means and said quantizing gate controller and an output resistor connected to said adder and said controller, said selective means being in inhibiting control of said adder when said linear divider is being employed in the digitization of a single phase analog, said decoder being in analog category control of said scanner and selective inhibiting control of said adder.

2. A universal analog to digital converter comprising an input multiplexer arranged to receive various types of analog and reference voltages, a function and address decoder connected to said multiplexer, a converter, said decoder having means to select in said multiplexer analog and corresponding reference voltages for introduction to said converter, said converter comprising a sine-cosine resolver output to three phase voltage converter, a non-linear voltage dividing network, means for selectively placing one phase of a three phase voltage in said network, a comparator, means for placing selectively one phase of the remaining two voltage phases in said comparator, a reference voltage connection between said multiplexer and said selective means, a gate system disposed between said non-linear voltage divider and said comparator, a quantizing gate controller and scanner for said gate system disposed in the output of said comparator and arranged to cause the latter component to sample sequentially the voltages on said non-linear voltage divider until the two input voltages in said comparator are equal, a linear voltage divider, a second gate system disposed between said linear voltage divider and said comparator, said multiplexer and decoder being arranged to pass selectively a reference voltage corresponding to the single phase analog voltage selected by said multiplexer and decoder to said linear voltage divider, a single phase analog voltage connection between said multiplexer and said comparator, means in said selective means and said single phase, analog connection for assuring that the selected single phase, analog voltage and its reference voltage will have opposing polarity, said second gate system being controlled by said quantizing gate controller and scanner so as to pass sequentially the various voltages on said linear voltage divider to said comparator until the input voltages in said comparator are equal, a parallel binary adder connected to said selective means and said quantizing gate controller and an output register connected to said adder and said controller, said selective means being in inhibiting control of said adder when said linear divider is being employed in the digitization of a single phase analog, said decoder being in analog category control of said scanner and selective inhibiting control of said adder.

3. In an analog to digital converting system, a converter comprising a sine-cosine resolver output to three phase voltage converter, a non-linear voltage dividing network, means for selectively placing one phase of a three phase voltage in said network, a comparator, means for placing selectively one phase of the remaining two voltage phase in said comparator, a reference voltage connection between said multiplexer and said selective means, a gate system disposed between said non-linear voltage divider and said comparator, a quantizing gate controller and scanner for said gate system disposed in the output of said comparator and arranged to cause the latter component to sample sequentially the voltages on said non-linear voltage divider until the two input voltages in said comparator are equal, a linear voltage divider, a second gate system disposed between said linear voltage divider and said comparator, said multiplexer and decoder being arranged to pass selectively a reference voltage corresponding to the single phase analog voltage selected by said multiplexer and decoder to said linear voltage divider, a single phase analog voltage connection between said multiplexer and said comparator, means in said selective means and said single phase, analog connection for assuring that the selected single phase, analog voltage and its reference voltage will have opposing polarity, said second gate system being controlled by said quantizing gate controller and scanner so as to pass sequentially the various voltages on said linear voltage divider to said comparator until the input voltages in said comparator are equal, a parallel binary adder connected to said selective means and said quantizing gate controller and an output register connected to said adder and said controller, said selective means being in inhibiting control of said adder when said linear divider is being employed in the digitization of a single phase analog, said decoder being in analog category control of said scanner and selective inhibiting control of said adder.

4. A universal analog to digital converter as claimed in claim 2 wherein a voltage peak detector is disposed between said reference voltage connection and said decoder.

5. A universal analog to digital converter as claimed in claim 4 wherein a minimum amplitude detector is arranged to receive the reference voltage corresponding to the single phase analog voltage passed to the linear voltage divider by said multiplexer and pass a control signal to said decoder.

6. A network for converting a pair of resolver output voltages to a three phase voltage comprising a pair of input leads, a three leg adding network, an operational amplifier, one of said legs being connected across said amplifier, the second leg being connected to one of said input leads and the third leg being connected to the other input lead, a two leg adding network, a second operational amplifier, one of said legs of the two leg adding network being connected to said other input lead and the other leg being connected across said second amplifier and a second three leg adding network, a third operational amplifier, one of the legs in said second three leg adding network being connected across said third operational amplifier, the second leg being connected to one of said input leads and the third leg thereof being connected to the output of the second amplifier, three output leads, one of the output leads being connected directly to one of the input leads and the other two output leads being connected respectively to said first and third amplifiers.

No references cited.